United States Patent Office 3,629,327
Patented Dec. 21, 1971

3,629,327
LITHIUM SALT OF HYDROQUINONE
SULFONIC ACID
Antonio Esteve-Subirana, Barcelona, Spain, assignor to
Laboratories Om S.A., Geneva, Switzerland
No Drawing. Continuation-in-part of application Ser. No.
600,721, Dec. 12, 1966, which is a continuation-in-part
of application Ser. No. 202,981, June 18, 1962, now
Patent No. 3,354,201, which in turn is a continuation-
in-part of application Ser. No. 2, Jan. 4, 1960. This
application Oct. 30, 1968, Ser. No. 771,977
Claims priority, application Switzerland, Nov. 9, 1967,
15,692/67, 15,693/67
Int. Cl. C07c 143/42
U.S. Cl. 260—512                                                5 Claims

ABSTRACT OF THE DISCLOSURE

The lithium salt of hydroquinone sulfonic acid of the formula

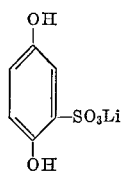

has therapeutic value for normalizing or reducing the abnormal permeability of the capillary wall of blood vessels of a person or animal having capillar fragility, and also for treating infections relative to blood coagulation. This novel salt can be prepared by reacting p-benzoquinone with lithium bisulfite in a solvent, or by reacting the potassium salt of hydroquinone sulfonic acid with a lithium salt of an inorganic or organic acid in a solvent wherein the lithium salt of hydroquinone sulfonic acid is soluble and wherein the potassium salt formed as a by-product is slightly or not soluble.

CROSS-REFERENCE TO RELATED APPLICATIONS

This application is a continuation-in-part of application Ser. No. 600,721, filed Dec. 12, 1966, now pending, which in turn is a continuation-in-part of application Ser. No. 202,981, filed June 18, 1962, now Pat. No. 3,354,201, the latter of which is a continuation-in-part of application Ser. No. 2, filed Jan. 4, 1960, and now abandoned.

The object of the present invention is the new lithium salt of hydroquinone sulfonic acid of the formula

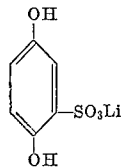

as well as the manufacture and use thereof.

The lithium salt of the above-mentioned formula has outstanding pharmaceutical properties for the treatment of various pathological states of the circulatory system, especially the tendency for hemorrhagies or simply of states which are precursors of hemorrhagies, i.e. in persons or animals having prolonged bleeding times. This lithium salt has great clinical value in preventing excessive hemorrhagies or difficultly controllable hemorrhagies as may occur after surgical interventions.

Said lithium salt has also given excellent results in the treatment of syndromes due to an abnormal fragility or permeability of the capillary wall of a person or animal. In these cases, a treatment with said lithium salt produces a normalization of the capillar resistance, which can be controlled by using known clinical and pharmacological tests.

The clinical use of the lithium salt of hydroquinone sulfonic acid, both in ill persons and animals, is greatly facilitated by the fact that this lithium salt is not harmful, independently of the way in which it is administered. Thus, the therapeutical use of this lithium salt offers a wide security range between the therapeutically active and the toxical dosis, i.e. that its therapeutical index is very favorable.

The lithium salt of hydroquinone sulfonic acid can be prepared by reacting p-benzoquinone with lithium bisulfite in a solvent.

For example, a mixture of water and alcohol may be used as a solvent. Thereto the 1,4-benzoquinone dissolved in an organic solvent, for example dichlorethylene, is added. It is desirable to cool the mixture during the reaction and to maintain the temperature between —5 and +10° C., preferably between about +5 and +10° C.

The lithium salt of hydroquinone sulfonic acid can be also prepared by reaction between the potassium salt of hydroquinone sulfonic acid and a lithium salt of another organic or inorganic acid, in a solvent in which the lithium salt of hydroquinone sulfonic acid is soluble and in which the potassium salt formed as a by-product is not soluble or only slightly soluble.

For example, perchlorate or bitartrate of lithium can be used as a starting material. In both cases the liquid in which the reaction is carried out may be water or aqueous ethanol. The reaction can be accelerated by slight heating; when it is finished, the product can be cooled in the vessel in which the reaction was carried out, to complete the precipitation of the potassium salt (bitartrate, perchlorate). The mixture is filtered by means of a porous plate to separate the liquid and solid phase, the solid phase which consists of the potassium salt discarded, the liquid phase concentrated by slight heating and under vacuum so as to avoid oxidation, then the concentrated solution is left to crystallize.

Perchlorate and bitartrate of lithium are easily obtained, for example by adding the necessary amount of lithium carbonate to a solution of perchlorate or tartaric acid.

EXAMPLE 1

24 g. of lithium hydroxide are added to 150 ml. of a mixture consisting of equal parts of water and alcohol. As lithium hydroxide is not very soluble in this mixture, particularly at low temperatures, a suspension is obtained. The latter is stirred and cooled to 0° C. Then a slight stream of sulfur dioxide gas is sent therethrough, stirring being maintained, and the temperature is maintained at 0° C.

The pH of the mixture, which at the beginning is above 10, decreases slowly to 5. The stream of sulfur dioxide is then interrupted and a stream of air is passed through the mixture in order to expell the excess of sulfur dioxide. The pH is measured and the air stream is stopped before the pH is above 5.8.

The water/alcohol solution of lithium bisulfite thus obtained is poured into a cooled vessel and kept at a temperature of 0° C. This vessel is provided with a fast and efficient stirrer to ensure sufficient mixing of this suspension with the non-miscible solution to be added.

A freshly prepared solution of 120 g. (1.1 mole) of 1,4-benzoquinone in 400 ml. of dichloroethane is now added stepwise to the cooled suspension under good stirring. The temperature tends to rise and is maintained at a maximum of 10° C.; the addition of quinone being interrupted when it rises above 10°. During the quinone addition, the mixture becomes almost black, and it becomes slightly brown again if stirring is continued. This phenomenon decreases during the reaction and the end of the reaction is shown by the difficulty and the slowness with which the black color of the quinhydrone disappears. When a slightly violet color persists, the addition of quinone to the solution is interrupted and stirring is maintained for 10 minutes.

After standing for 4 to 6 hours, a substantially solid upper layer, consisting of a mixture of hydroquinone and lithium p-hydroxybenzene sulfonate crystals, appears. This layer is separated from the lower practically colorless layer of dichloroethane, and dissolved in an amount of water just sufficient to dissolve the desired lithium salt but not the hydroquinone. The latter is removed by filtration.

The aqueous solution thus obtained is concentrated in the absence of air and, after cooling, the lithium p-hydroxybenzene sulfonate crystallizes. This salt is separated by filtration and recrystallized in 50% alcohol.

56 g. of said lithium salt, in the form of colorless crystals, are obtained; they are readily soluble in water and in alcohol and insoluble in ether. The temperature of decomposition is about 250° C.

EXAMPLE 2

200 ml. of an aqueous solution containing 100 g. of perchloric acid are neutralized by carefully adding 37 g. of lithium carbonate.

228 g. of the potassium salt of p-dihydroxybenzene sulfonic acid are dissolved in 500 ml. of water, and heated in order to facilitate the dissolution. The solution of lithium perchlorate previously prepared is added by stirring it into this hot solution.

After one minute, a voluminous crystalline precipitate of potassium perchlorate is formed, whose amount increases even more when the stirred solution is cooled.

The cold mixture thus obtained is filtered and the potassium perchlorate removed. The aqueous solution is concentrated in the absence of air, under vacuum, until the crystallization of the lithium salt starts.

The crystalline mass is separated by filtering the mother-liquid and is recrystallized in 50% alcohol. 188 g. of the lithium salt of p-hydroxybenzene sulfonic acid are thus obtained, the crystals of which are very soluble in water, less soluble in alcohol and insoluble in ether. The temperature of decomposition is about 250° C.

EXAMPLE 3

350 ml. of an aqueous solution, containing 150 g. of tartaric acid, are half neutralized by adding stepwise under stirring, 37 g. of lithium carbonate. A solution of bitartrate of lithium ($C_4H_5O_6Li$) is thus obtained.

This solution, filtered if necessary, is added to a hot solution of 228 g. of the potassium salt of p-hydroxybenzene sulfonic acid in 500 ml. of water. The two solutions are mixed together by stirring, and the temperature continues to rise for a few minutes.

Stirring is continued and a white crystalline precipitate of potassium bitartrate is formed, the amount of which increases when the mixture is cooled. The latter is maintained for six hours in a refrigerator and then the potassium bitartrate is separated by filtration.

The solution of lithium p-hydroxybenzene sulfonate is concentrated at a low temperature, in the absence of air, by stirring under vacuum. When the concentration is sufficient, a spontaneous crystallization occurs. The crystals are separated by filtering the mother-liquid, washed with a little alcohol-ether (1:1) and recrystallized in 50% alcohol.

114 g. of lithium p-hydroxybenzene sulfonate in the form of colorless crystals, very soluble in water, less soluble in alcohol and insoluble in ether, are thus obtained. The temperature of decomposition is about 250° C.

Acute toxicity of the lithium salt of hydroquinone sulfonic acid

Tests have been made with white mice of a weight of 18 to 22 g. each. The lithium salt was injected as an aqueous solution into the lateral vein of the tail. The amount injected was 0.5 ml. of a solution of 4% or 8% of the lithium salt respectively, per 20 g. of animal. The duration of injection was 1 minute. Ten animals were tested.

The toxicity was measured after 24, 48 and 72 hours respectively after the injection, but the toxicity did not change in time. The following results were obtained:

| Dose in mg./kg. | Mortality | Percent |
|---|---|---|
| 1,000 | 0/10 | 0 |
| 2,000 | 6/10 | 60 |

NOTE.—$DL_{50}$—1,900 mg./kg.

Therapeutical and pharmacological activity

The pharmacological activity was determined by measuring the mean bleeding time before and after administration of various doses of said lithium salt, according to the following manner:

White rabbits of both sexes, of a weight between 1 and 2 kg. were used. Before injection, the mean bleeding time was measured in one ear, and one hour after intravenous injection of a distinct dose of an aqueous solution of the lithium salt of hydroquinone sulfonic acid, the mean bleeding time was again measured in the other ear of the animal. The method is a slight modification of the well known method of Roskam. Four groups of five incisions each were made and the time determined after which bleeding of each group stopped. The mean value of all groups is the mean bleeding time.

From the mean bleeding time before and after injection of the lithium salt, the percentage of reduction of the bleeding time is calculated. Each dose was tested on at least six rabbits.

The results obtained are as follows:

| Dose in mg./kg. | Percent reduction of the mean bleeding time, percent |
|---|---|
| 0.31 | 4 |
| 0.62 | 21 |
| 1.25 | 32 |
| 2.50 | 41 |
| 5.0 | 45 |

Administration of the medicament

The therapeutical administration of the lithium salt of hydroquinone sulfonic acid in human therapy can be made in all usual ways, i.e. orally, parenterally or rectally, e.g. in the form of tablets, capsules, injectable solutions or suppositories. Examples of the most recommended unit pharmaceutical doses are the following:

Injectable solutions for parenteral administration containing 250 mg. of the lithium salt of hydroquinone sulfonic acid in 2 ml. of sterile distilled water. The dose is 250 mg. to 1 g. per day.

Tablets containing 250 mg. of the lithium salt of hydroquinone sulfonic acid and a usual excipient of 100 mg., so that the tablet weight is 350 mg. The dose per day is 4 to 6 tablets.

Suppositories containing 500 mg. of the lithium salt of hydroquinone sulfonic acid and a usual excipient for rectal suppositories. The dose is 1 to 2 suppositories per day.

These doses are examples only, and the amount administered per day can be higher or lower, within the limits of clinical efficiency.

Clinical tests

The clinical efficiency and the inoffensivness of said lithium salt has been tested according to the details given hereafter. These tests have shown a perfect tolerance of the lithium salt and very good results.

The tests were made on patients suffering from respiratory troubles (with the exclusion of active tuberculosis). During the tests, all other therapeutical treatments were interrupted, so as to determine the angioprotective action of the lithium salt of hydroquinone sulfonic acid. The tests were made in the Servicio de Patologia Respiratoria del Hospital de la Santa Cruz y de San Pablo, at Barcelona, Spain.

The test method used was the modified method of Hachen, i.e. the measurement of the rubefaction zone produced by a dermical hyperaemia, before and after administration of said lithium salt.

The investigation of the angioprotective action of the lithium salt was the only purpose of the clinical tests, and supposed to be completely independent of the illness of each person treated. Patients known to have blood troubles previously have not been considered.

After application of the rubefacient pomade on the right forearm, the hyperaemic zone was measured, 24 hours later, 500 mg. of said lithium salt were injected intramuscularly. One hour later the rubefacient pomade was again put on the forearm and the area of the hyperaemic zone was measured. The results were as follows:

| Patient | Age | Sex | Erithema surface in mm.² | | Diagnosis |
| --- | --- | --- | --- | --- | --- |
| | | | Before injection | After injection | |
| J.G.T. | 26 | M. | 1,575 | 825 | Asthma allergica. |
| T.R.P. | 31 | F. | 1,600 | 775 | Bronchitis asthmatica. |
| A.H.F. | 18 | M. | 1,375 | 525 | Asthma allergica. |
| J.P.R. | 46 | M. | 850 | 725 | Bronchitis chronica. |
| Mean | 30 | | 1,350 | 712 | |

Note.—Mean percentage of reduction, 47.2%.

I claim:

1. A method for making the lithium salt of hydroquinone sulfonic acid of the formula:

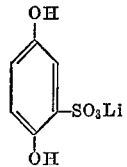

comprising reacting the potassium salt of hydroquinone sulfonic acid with a lithium salt of an organic or inorganic acid, in a solvent selected from the group consisting of water and mixtures of water and ethyl alcohol.

2. A method according to claim 1, wherein the starting material is selected from the group consisting of lithium perchlorate and lithium bitartrate.

3. A method for manufacturing the lithium salt of hydroquinone sulfonic acid of the formula

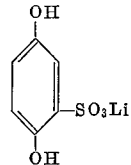

comprising reacting in a solvent p-benzoquinone and lithium bisulfite.

4. A method according to claim 3, wherein said solvent is a mixture of water and an alcohol.

5. A method according to claim 3, wherein the reaction is carried out between −5° C. and +10° C.

References Cited

FOREIGN PATENTS

| 771,180 | 3/1957 | Great Britain | 260—396 |
| 895,709 | 5/1962 | Great Britain | 260—511 |
| 363,033 | 8/1962 | Switzerland | 260—512 |

OTHER REFERENCES

OM: Chem. Abstracts 58, 3332b (1963).
OM: Chem. Abstracts 61, 4274g (1964).
Foster: Inorganic Chemistry for Colleges, p. 586.

DANIEL D. HORWITZ, Primary Examiner

U.S. Cl. X.R.

424—335